United States Patent
Magnusson et al.

(10) Patent No.: US 6,657,814 B2
(45) Date of Patent: Dec. 2, 2003

(54) TRANSDUCING HEAD FOR TAPE DRIVE

(75) Inventors: Steven L. Magnusson, Boulder, CO (US); Wolfgang Nichtl-Pecher, Zirndorf (DE)

(73) Assignee: Exabyte Corporation, Boulder, CO (US)

( * ) Notice: Subject to any disclaimer, the term of this patent is extended or adjusted under 35 U.S.C. 154(b) by 225 days.

(21) Appl. No.: 09/953,436

(22) Filed: Sep. 17, 2001

(65) Prior Publication Data

US 2002/0034044 A1 Mar. 21, 2002

Related U.S. Application Data (60) Provisional application No. 60/232,835, filed on Sep. 15, 2000.

(51) Int. Cl.[7] .............................................. G11B 5/127
(52) U.S. Cl. ...................................................... 360/125
(58) Field of Search ................................... 360/125, 126

(56) References Cited

U.S. PATENT DOCUMENTS

| | | |
|---|---|---|
| 3,813,693 A | 5/1974 | Gooch et al. |
| 4,843,495 A | 6/1989 | Georgis et al. |
| 4,845,577 A | 7/1989 | Georgis et al. |
| 5,050,018 A | 9/1991 | Georgis et al. |
| 5,680,269 A | 10/1997 | Georgis et al. |
| 5,812,337 A * | 9/1998 | Tanaka et al. ........... 360/73.12 |

OTHER PUBLICATIONS

U.S. patent application 09/492,345, filed Jan. 2000, entitled "Power Supply Circuit and Method of Calibration Therefor".

* cited by examiner

*Primary Examiner*—George J. Letscher
(74) *Attorney, Agent, or Firm*—Nixon & Vanderhye, P.C.

(57) ABSTRACT

A transducing head (740) for a magnetic tape recorder comprises a first magnetic pole (744) and a second magnetic pole (742) positioned to form a gap therebetween. The first magnetic pole (744) has a first magnetic pole width H3 along the gap and the second magnetic pole (744) has a second magnetic pole width H1 along the gap. The first magnetic pole width H3 and the second magnetic pole width H1 are formed to satisfy the relation H1<H3<3T<H2, wherein H2 is a physical tape contact width of the transducing head and 3T is a width of three adjacent recorded tracks traversed by the head.

7 Claims, 8 Drawing Sheets

TRANSDUCING HEAD FOR TAPE DRIVE

This application claims the priority and benefit of U.S. Provisional Patent Application Serial No. 60/232,835, filed Sep. 15, 2000, which is incorporated herein by reference in its entirety.

BACKGROUND

1. Field of the Invention

This invention pertains to magnetic recording, and particularly to transducing heads for recording and reproduction of signals on/from magnetic tape.

2. Related Art and Other Considerations

Figure 1:
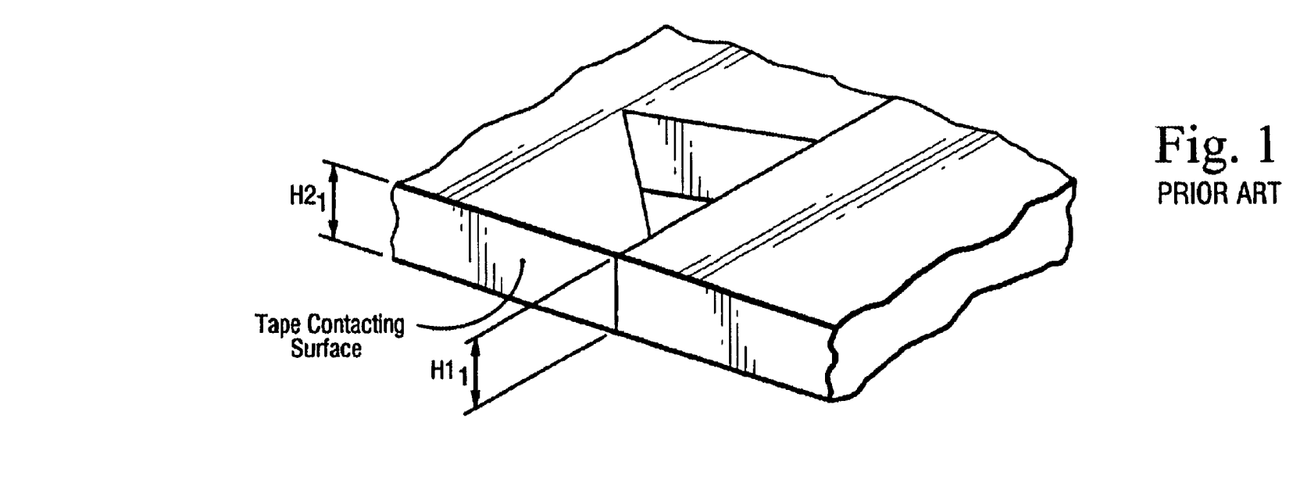
FIG. 1 is a perspective view of portions of a prior art tranducing head.

In the time frame from about the year 1955 to about the year 1970, tranducing heads for helical scan tape drives were designed with simple construction. In these simple heads the two magnetic pole halves (which were joined to form a magnetic gap therebetween) were of uniform thickness such that the effective magnetic headwidth, $H1_1$, was equal to the physical tape contact width, $H2_1$, as shown in FIG. 1.

Figure 2:
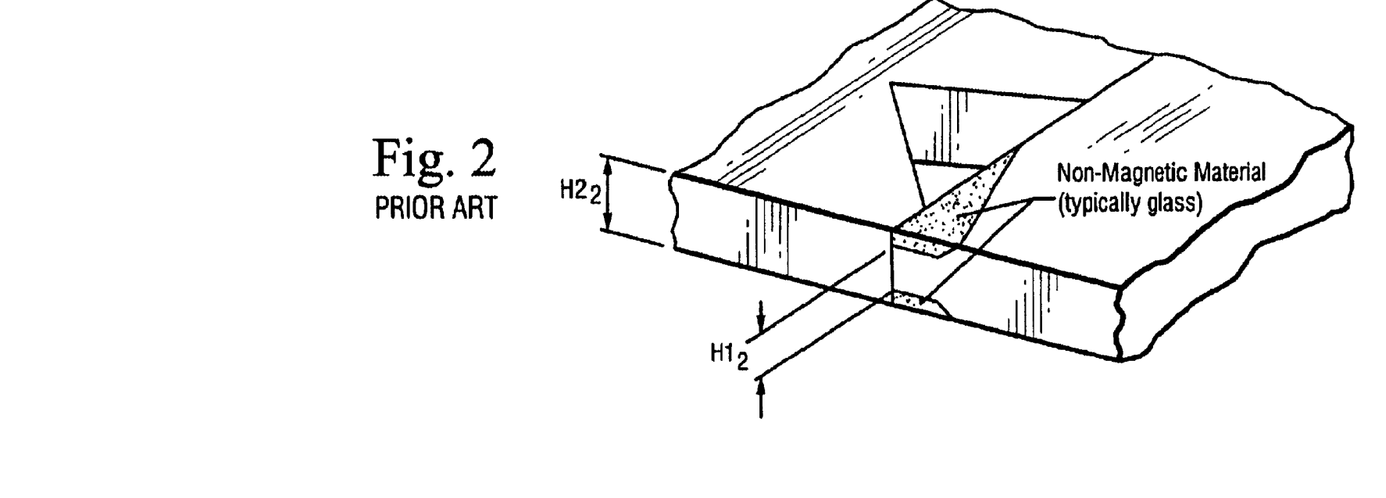
FIG. 2 is a perspective view of portions of another prior art tranducing head.

As recorded track densities increased (circa early 1970s), smaller effective magnetic headwidths were required. In view of the requirement for smaller headwidths, it was not practical for tribological reasons to reduce the physical tape contact width by the same amount. Consequently, manufacturers developed a new design (illustrated in FIG. 2) wherein one of the two magnetic pole pieces was micro-machined to create a smaller effective magnetic headwidth, $H1_2$, while providing a larger physical tape contact width, $H2_2$. In this regard, see also U.S. Pat. No. 3,813,693 to Gooch et al.

Figure 3:
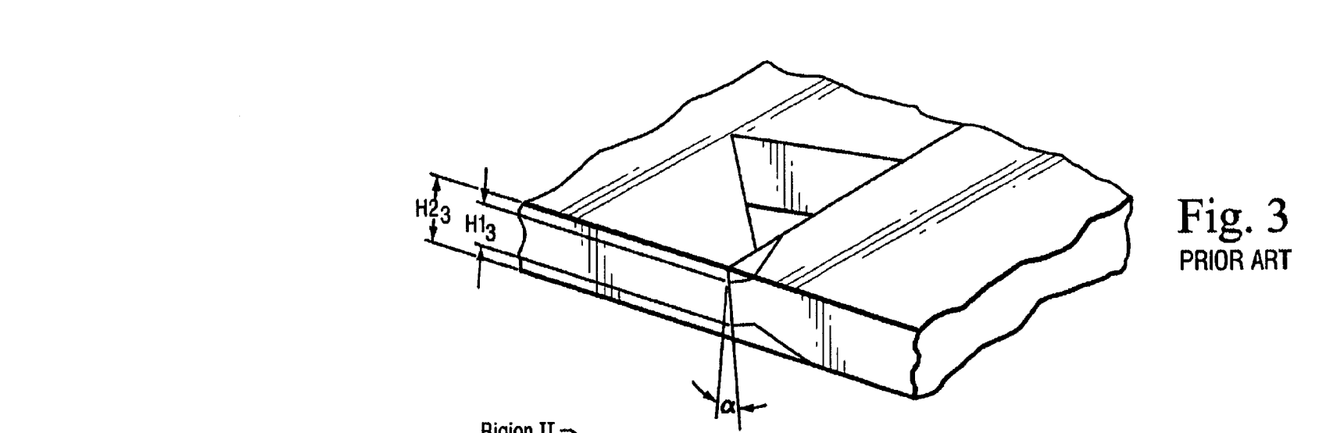
FIG. 3 is a perspective view of portions of another prior art tranducing head.
Figure 4:
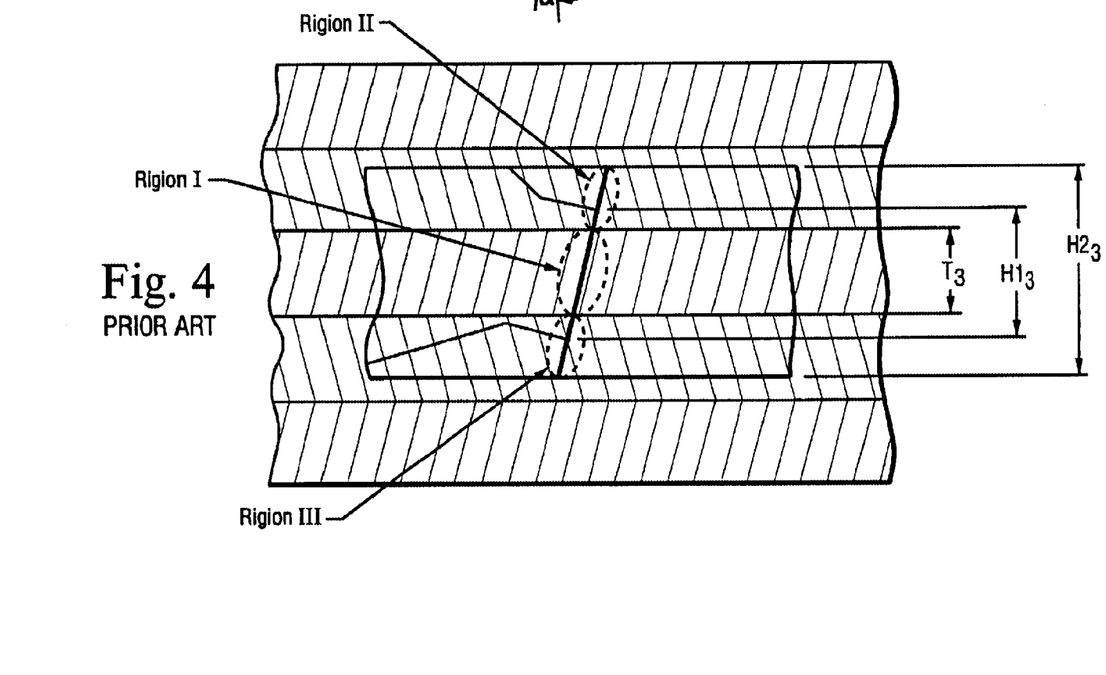
FIG. 4 is a diagrammatic view illustrating how a read head of FIG. 3 is positioned relative to a pattern of recorded alternating azimuth tracks.

When narrow-track azimuth digital recording formats (e.g., D-2) were developed in the mid-1980s, a construction similar to that of FIG. 3 was successfully used. In FIG. 3, α represents the azimuth angle. The FIG. 3-tyype structure worked well because the physical tape contact width, $H2_3$, was less than the width of three adjacent recorded tracks, $3T_3$ (i.e. $H2_3<3T_3$). FIG. 4 illustrates how a read head of FIG. 3 would be positioned relative to the pattern of recorded alternating azimuth tracks each of width $T_3$. As understood from FIG. 4, the desired signal is recovered from Region I where the effective magnetic read headwidth overlaps the desired same-azimuth recorded track, and the undesired signals from Regions II and III are greatly reduced by the well-known azimuth-loss effect since the recorded transitions in these areas are not parallel to the effective magnetic headwidth nor to the edges of the wider magnetic pole half.

Figure 5:
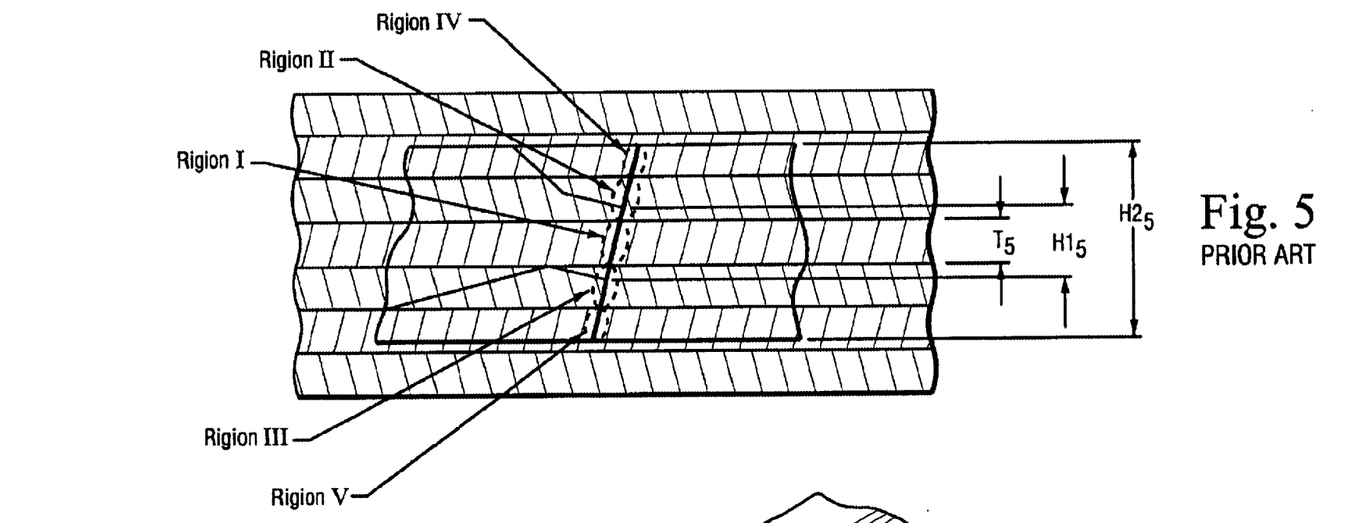
FIG. 5 is a diagrammatic view illustrating how a read head of FIG. 3 would be positioned relative to an ultra-narrow track pattern of recorded alternating azimuth tracks.

Ultra-narrow-track azimuth digital recording formats, such as that involved in the Mammoth™ tape drive technology developed by Exabyte Corporation, were developed in the early-1990s. In this ultra-narrow-track azimuth digital recording format, a read head design similar to that of FIG. 3 was no longer useful, since again for tribological reasons, the physical tape contact width, $H2_5$, could not be made less than the width of three adjacent recorded tracks. Consequently, the physical tape contact width, $H2_5$, would now overlap 5 or more adjacent tracks as shown in FIG. 5. Since the edges of the wider magnetic pole half now overlapped adjacent tracks where the transitions are parallel to these edges, the undesired signals picked up from these areas (Regions IV and V) are not reduced by the azimuth-loss effect and the SNR of the system suffers greatly.

Figure 6:
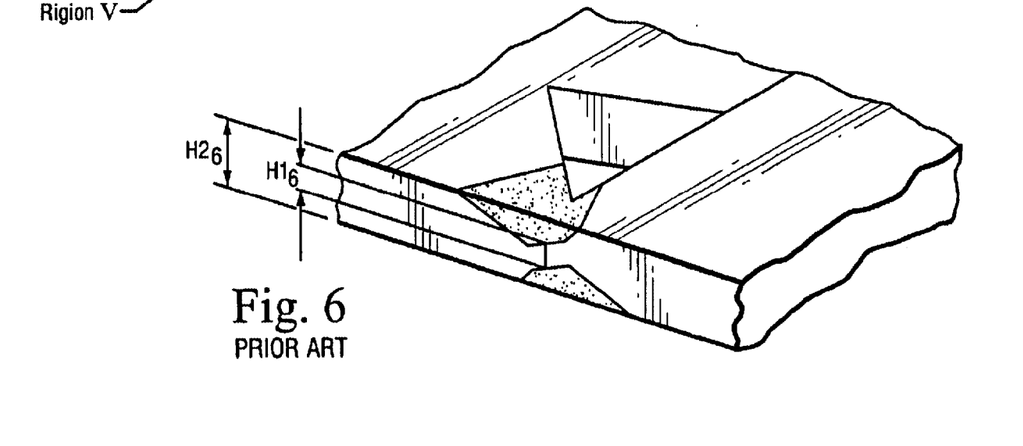
FIG. 6 is a perspective view of portions of another prior art tranducing head.

To overcome the problems described above, manufacturers developed another new head type where both of the magnetic pole halves are micro-machined as shown in FIG. 6. While the construction of FIG. 6 eliminates the undesired signal pick-up from Regions IV and V, it has some disadvantages compared to the design of FIG. 3. A first such disadvantage is that the magnetic efficiency of the head is reduced since the cross-sectional area of the magnetic material near the magnetic gap area is reduced. A second disadvantage is that the design requires micro-machining both of the magnetic pole halves. A third disadvantage is that alignment of the two magnetic pole halves relative to each other is critical—any misalignment between the magnetic pole halves reduces the effective magnetic headwidth, H1.

What is needed, therefore, and an object of the present invention, is a transducing head that has higher magnetic efficiency and improved manufacturability compared to the conventional ultra-narrow track read head design.

BRIEF SUMMARY OF THE INVENTION

A transducing head for a magnetic tape recorder comprises a first magnetic pole and a second magnetic pole positioned to form a gap therebetween. The first magnetic pole has a first magnetic pole width H3 along the gap and the second magnetic pole has a second magnetic pole width H1 along the gap. The first magnetic pole width H3 and the second magnetic pole width H1 are formed to satisfy the relation $H1<H3<3T<H2$, wherein H2 is a physical tape contact width of the transducing head and 3T is a width of three adjacent recorded tracks traversed by the head.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices and methods are omitted so as not to obscure the description of the present invention with unnecessary detail.

Figure 7:
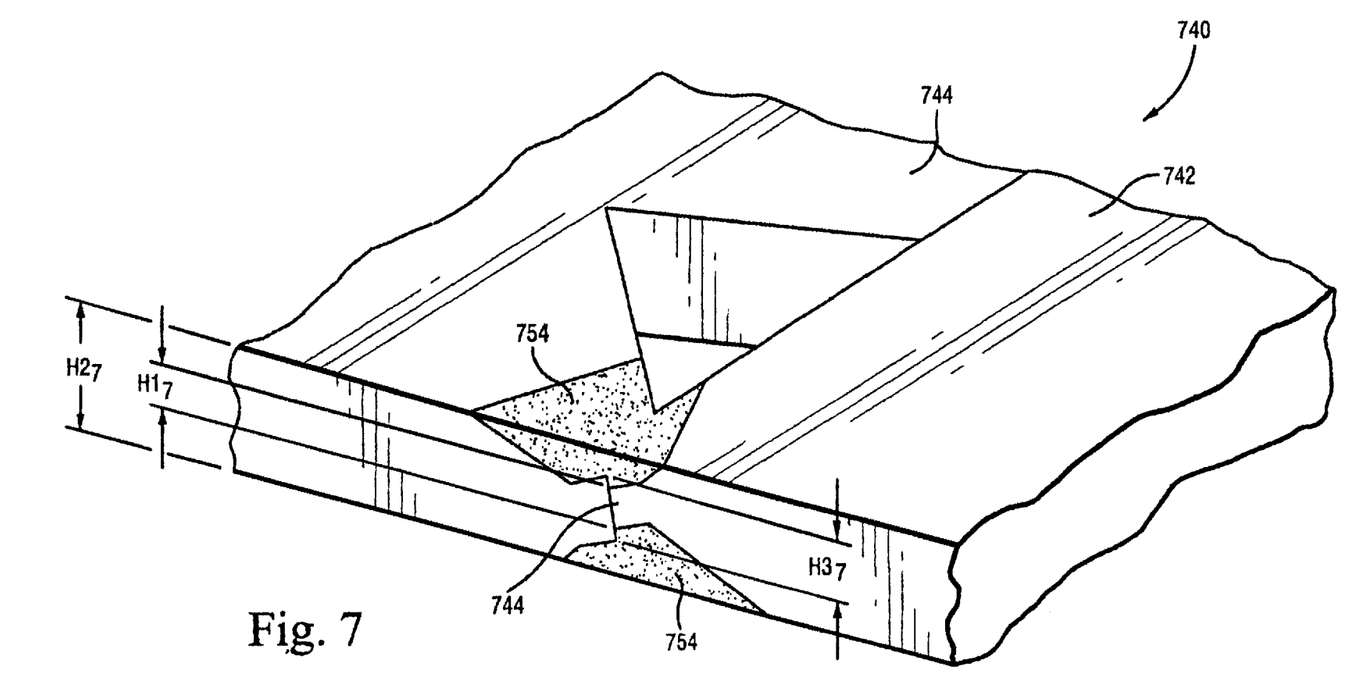
FIG. 7 is a perspective view of portions of a tranducing head according to an embodiment of the present invention.
Figure 7A:
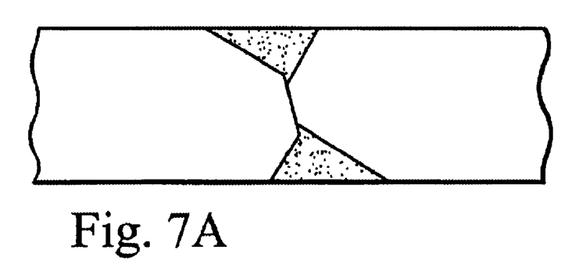
FIG. 7A–FIG. 7F are plan views of portions of tranducing heads according to differing embodiments of the present invention.
Figures 7B, 7D, 7F:
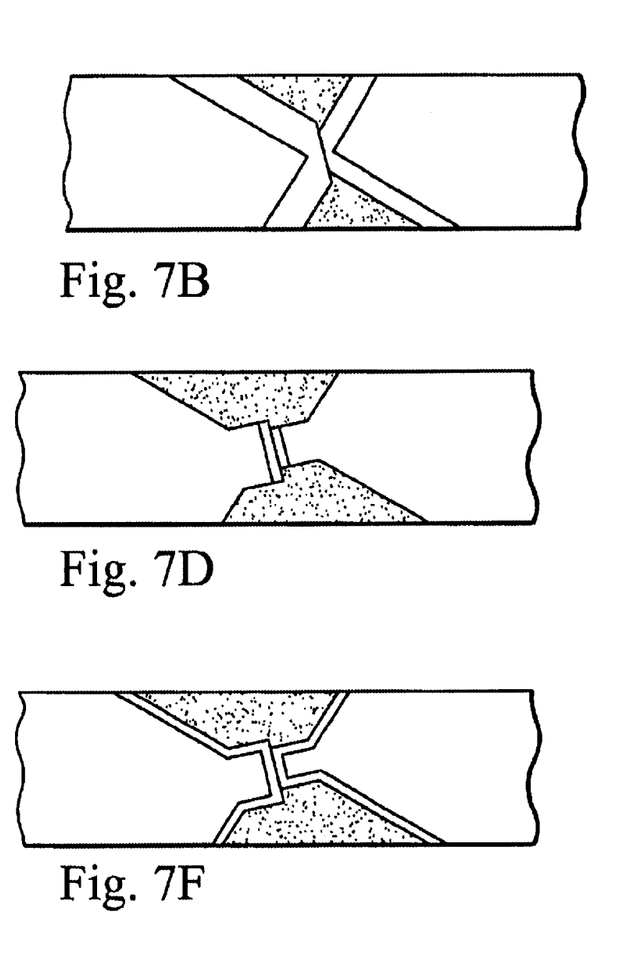
Figure 7C:
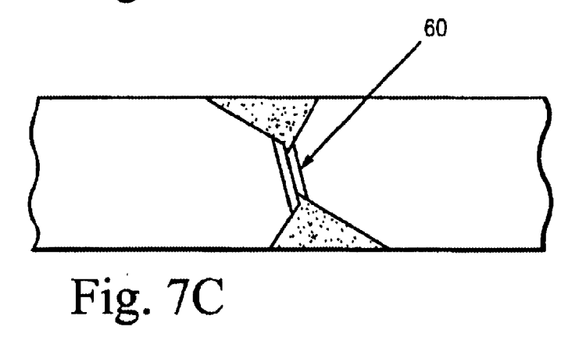
Figure 7E:
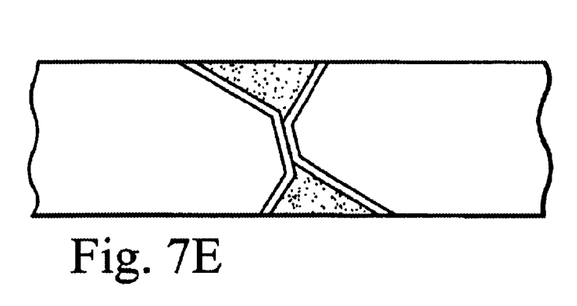

FIG. 7 shows a magnetic transducing element or head 740, such as a read head, which comprises two magnetic pole halves 42 and 744. A magnetic gap 744 exists between pole halves 742 and 744. The gap 744 is preferably formed in accordance with the desired azimuth angle, as commonly understood in helical scan technology.

Along the gap 744, transducing head 740 has the width of one of its poles sized at a larger width value than the other of its poles. For example, in FIG. 7 the width of pole 744 is $H3_7$, with width $H3_7$ being a larger value than width $H1_7$ of pole 742. The widths $H3_7$ and $H1_7$ are chosen to satisfy the following relation: $H1_7 < H3_7 < 3T_7 < H2_7$, in which $H2_7$ is the physical tape contact width of head 740 and $3T_7$ is a width of three adjacent recorded tracks.

In one example mode of the invention, the widths $H3_7$ and $H1_7$ are formed by micro-machining the respective poles 744, 742, and supplying non-magnetic materials (e.g., glass, for example) in machined regions 54.

Although the head 740 of FIG. 7 requires essentially the same amount of micro-machining work as the read head design of FIG. 6, the cross-sectional area of the wider magnetic pole half near the magnetic gap area is increased. This cross sectional area increase improves the magnetic efficiency and the requirement for precise alignment between the two magnetic pole halves is eliminated. This, in turn, improves manufacturability (since the effective magnetic headwidth, $H1_7$, is controlled by the width of the narrower magnetic pole half only).

Several alternate example construction embodiments are shown in FIG. 7A–FIG. 7F. As illustrated by these example, non-limiting embodiments, each magnetic pole half can be formed as (1) a single magnetic material (e.g., ferrite); (2) a magnetic material and a magnetic thin film (.e.g, FeTaN) [such film 60 depicted in FIG. 7C]; and/or (3) a non-magnetic material and a magnetic metal film. Also the shape of the micro-machined areas can take various forms as long as the edges of the magnetic materials outside of the effective magnetic headwidth area which come into contact with the recorded magnetic transitions are not parallel to any of the recorded magnetic transitions.

The transducing head 740 of the present invention has higher magnetic efficiency and improved manufacturability compared to the conventional ultra-narrow track read head design.

Figure 8:
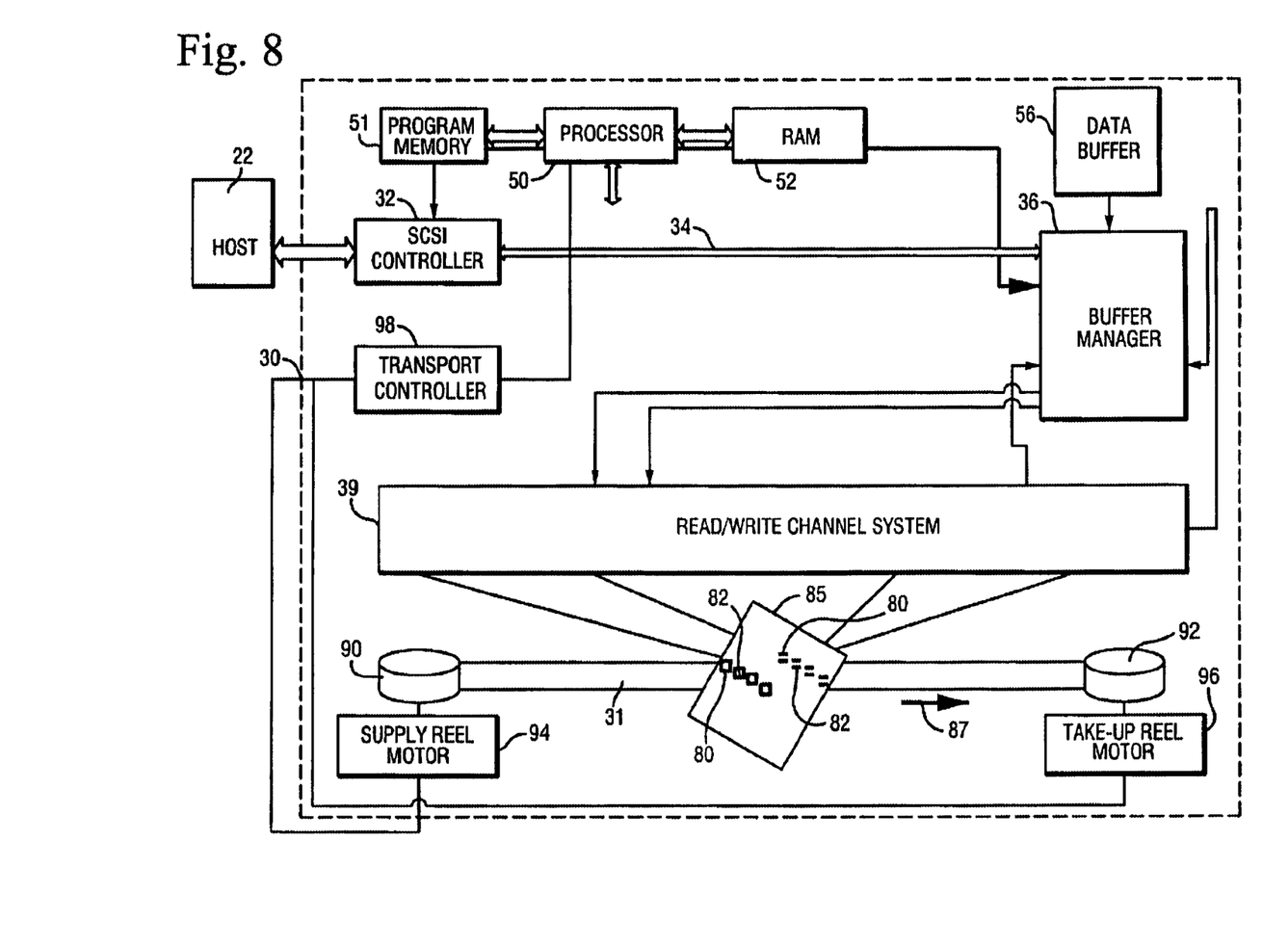
FIG. 8 is a schematic view of an example tape drive, according to one embodiment of the present invention, which utilizes the transducing head of the present invention.

FIG. 8 shows non-limiting example tape drive 30 in which the transducing head 740 of the present invention can be utilized. In particular, FIG. 8 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to a read/write channel system 39. The read/write channel system 39 is connected to one or more recording element(s) or write head(s) 80 and to one or more read element(s) or read head(s) 82, which can be the transducing heads 740 of the present invention.

The write head(s) 80 and the read head(s) 82 are mounted on a peripheral surface of a rotatable drum or scanner 85. Tape 31 is wrapped around scanner 85 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference.

Figure 9:
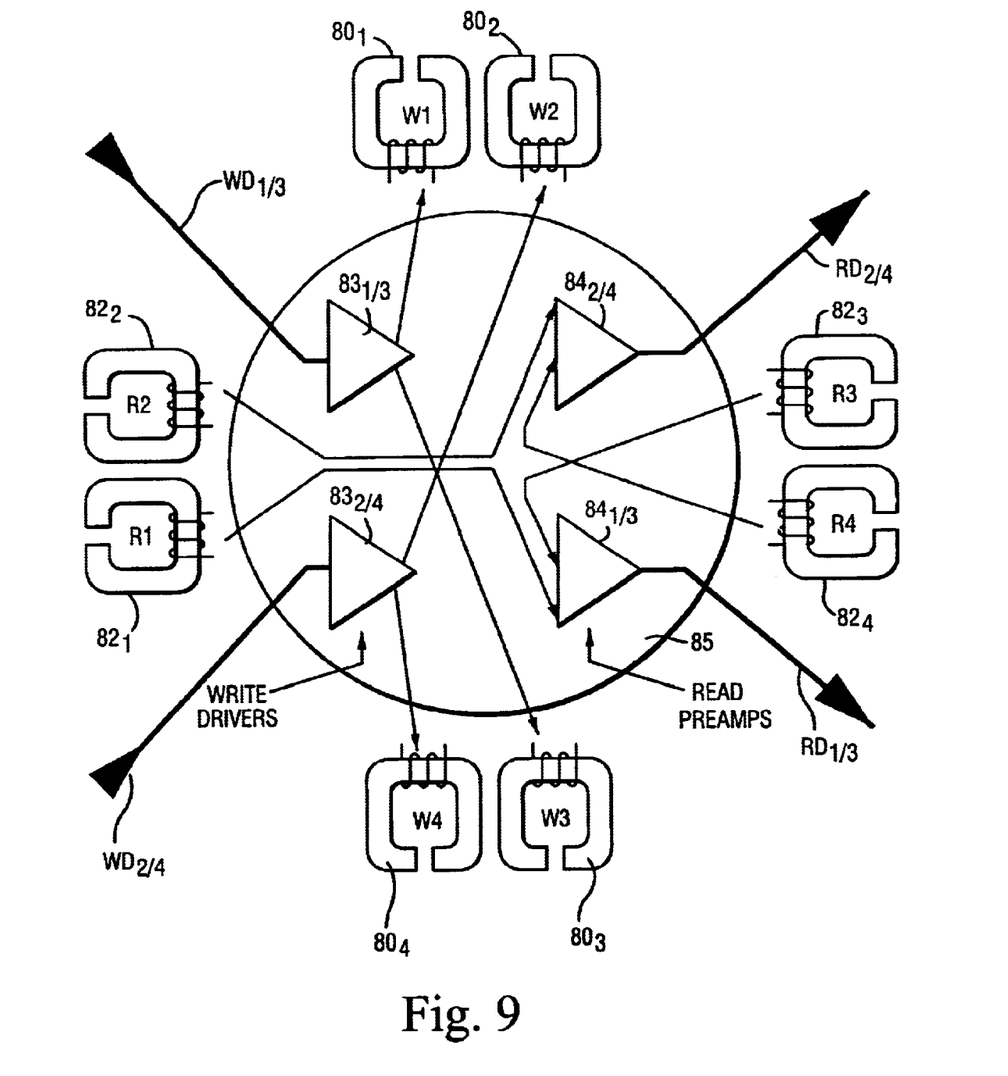
FIG. 9 is a schematic view of an example scanner, showing write and read heads as well as certain scanner-mounted electronics.

In one example embodiment, four write heads and four read heads are mounted on the drum 85, with each channel being switchably connected to two heads. FIG. 9 schematically illustrates drum 85, also known as a scanner, which has four write heads $80_1$–$80_4$ and four read heads $82_1$–$82_4$ mounted on its periphery. FIG. 9 does not show the four write heads $80_1$–$80_4$ and four read heads $82_1$–$82_4$ as being precisely mounted, but rather arranged about the drum 85 in a general pattern of head placement. It should be understood, however, that the four write heads $80_1$–$80_4$ and four read heads $82_1$–$82_4$ are, in fact, mounted on the periphery of scanner 85 for transducing information relative to tape 31. The present invention is not limited by such factors as, for example, the number of heads employed.

In addition to write heads 80 and read heads 82, as further shown in FIG. 9 scanner 85 also has certain electronics mounted thereon. The scanner-mounted electronics include write drivers $83_{1/3}$ and $83_{2/4}$, as well as read preamplifiers $82_{1/3}$ and $82_{2/4}$. Write data signals are applied on lines shown generally as $WD_{1/3}$ and $WD_{2/4}$ in FIG. 8 to write drivers $83_{1/3}$ and $83_{2/4}$, respectively. As the subscripts indicate, the write data carried by line $WD_{1/3}$ is applied to write driver $83_{1/3}$, which supplies a write data signal to write heads $80_1$ and $80_3$. The write data carried by line $WD_{2/4}$ is applied to write driver $83_{2/4}$, which supplies a write data signal to write heads $80_2$ and $80_4$. Because the tape is only wrapped 180 degrees around the scanner 85, only one of the two write heads on each write driver is in contact with the tape at a time. In other words, during a first portion of the revolution of scanner 85, the write head $80_1$ is connected to write driver $83_{1/3}$, while during a second portion of the revolution of scanner 85, the write head $80_3$ is connected to write driver $83_{1/3}$. Similarly, during a first portion of the revolution of scanner 85, the write head $80_2$ is connected to write driver $83_{2/4}$, while during a second portion of the revolution of scanner 85, the write head 80$_4$ is connected to write driver 83$_{2/4}$. So the separation of the data on the two heads is in time, and the same data lines may be used to couple the write data into the scanner. An unillustrated control element switches the heads at the appropriate time dependent on scanner position.

In converse fashion, the data transduced by read heads 82$_1$ and 82$_3$ are applied to read preamplifier 84$_{1/3}$, while the data transduced by read heads 82$_2$ and 82$_4$ are applied to read preamplifier 84$_{2/4}$. The outputs from read preamplifier 84$_{1/3}$ and read preamplifier 84$_{2/4}$ are transmitted from scanner 85 as read data signals on lines shown generally as RD⅓ and RD¾, respectively, in FIG. 9. During a first portion of the revolution of scanner 85, the read head 82$_1$ is connected to read preamplifier 84$_{1/3}$, while during a second portion of the revolution of scanner 85, the read head 82$_3$ is connected to read preamplifier 84$_{1/3}$. Similarly, during a first portion of the revolution of scanner 85, the read head 82$_2$ is connected to read preamplifier 84$_{2/4}$, while during a second portion of the revolution of scanner 85, the read head 82$_4$ is connected to read preamplifier 84$_{2/4}$.

In addition to the electronics illustrated in FIG. 9, other electronics are provided on scanner 85. Included in the unillustrated electronics is the supply of voltage to 85, which is understood with reference to U.S. patent application Ser. No. 09/492,345, filed Jan. 27, 2000, entitled "Power Supply Circuit And Method Of Calibration Therefor", which is incorporated herein by reference in its entirety.

Figure 10:
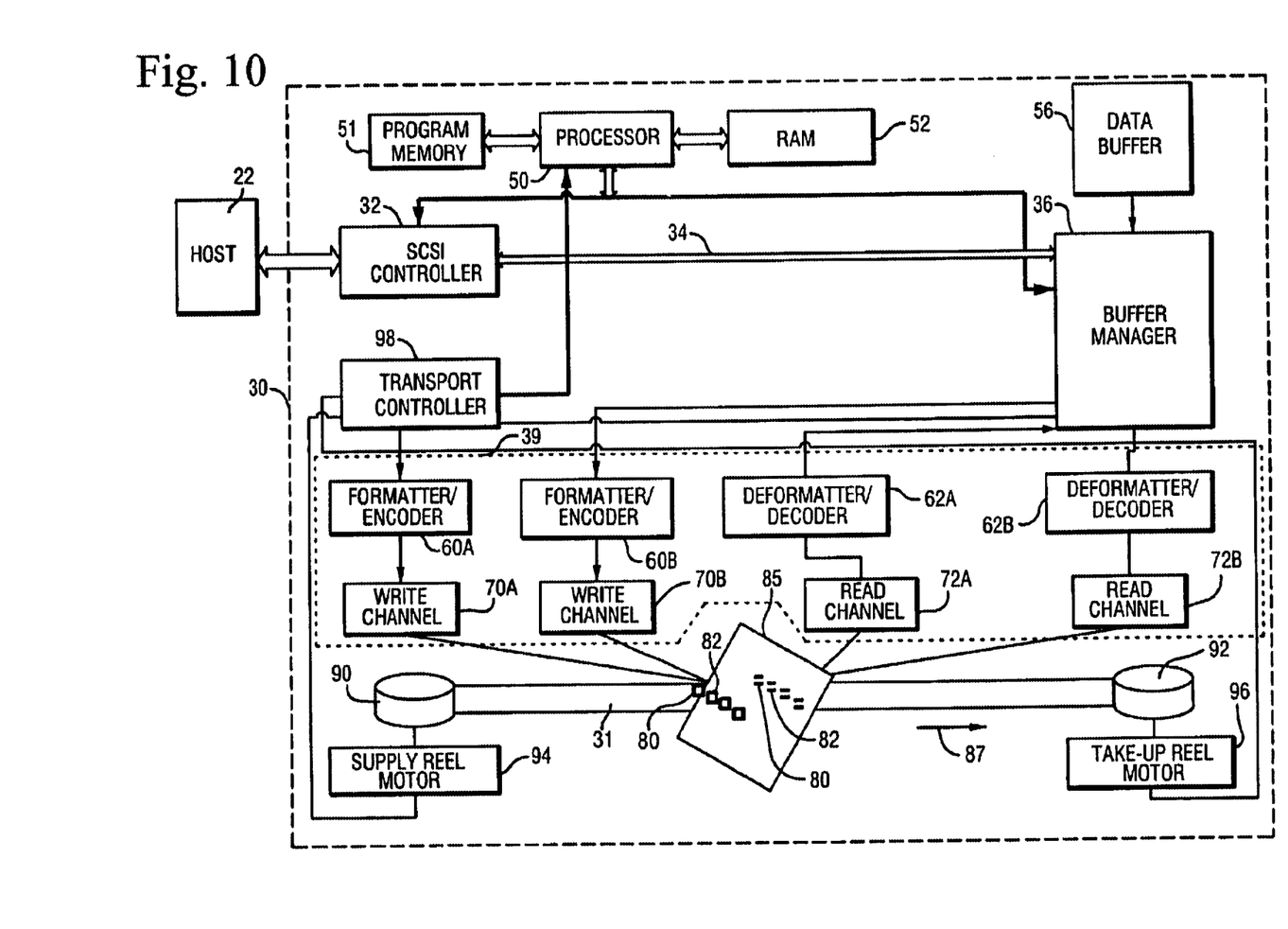
FIG. 10 is a schematic view of the example tape drive of FIG. 8, showing certain further details of a read/write channel system.

FIG. 10 illustrates one example embodiment read/write channel system 39 which comprises two formatter/encoders 60A and 60B and two deformatter/decoders 62A and 62B, as well as two respective write channels 70A and 70B and two respective read channels 72A and 72B. Buffer manager 36 is connected to the two formatter/encoders 60A and 60B and to the two deformatter/decoders 62A and 62B. Formatter/encoders 60 and deformatter/decoders 62 are, in turn, respectively connected to the write channels 70 and read channels 72. In particular, formatter/encoder 60A and formatter/encoder 60B are respectively connected to write channel 70A and write channel 70B, respectively, while deformatter/decoder 62A and deformatter/decoder 62B are connected to read channel 72A and read channel 72B, respectively. Each write channel 70 is connected to one or more recording element(s) or write head(s) 80; each read channel is connected to one or more read element(s) or read head(s) 82. As previously explained, the write head(s) 80 and the read head(s) 82 are mounted on the rotatable drum or scanner 85. In the illustrated embodiment, each of the channels 70A, 70B, 72A, and 72B are connected to two heads, the connection between the two heads being switched with respect to each channel in accordance with rotational position of scanner 85.

Those skilled in the art will appreciate that each write channel 70 includes various circuits and elements including a RLL modulator, a parallel-to-serial converter, and write current modulator. Similarly, the person skilled in the art understands that each read channel 72 includes a data pattern and clock recovery circuitry, a serial-to-parallel converter, and, an RLL demodulator. These and other aspects of tape drive 30, including, e.g., error correction, are not necessary for an understanding of the invention and accordingly are not specifically described herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transducing head for a magnetic tape recorder comprising:

a first magnetic pole;

a second magnetic pole;

the first magnetic pole and the second magnetic pole positioned to form a gap therebetween;

the first magnetic pole having a first magnetic pole width H3 along the gap and the second magnetic pole having a second magnetic pole width H1 along the gap, the first magnetic pole width H3 and the second magnetic pole width H1 being chosen to satisfy the following relation H1<H3<3T<H2, wherein H2 is a physical tape contact width of the transducing head and 3T is a width of three adjacent recorded tracks traversed by the head.

2. The apparatus of claim 1, wherein at least one of the first magnetic pole and the second magnetic pole comprises a magnetic material and a magnetic thin film.

3. The apparatus of claim 1, wherein at least one of the first magnetic pole and the second magnetic pole comprises a non-magnetic material and a magnetic metal film.

4. A magnetic tape drive comprising a transport system which transports magnetic tape past a transducing head, and wherein the transducing head comprises:

a first magnetic pole;

a second magnetic pole;

the first magnetic pole and the second magnetic pole positioned to form a gap therebetween;

the first magnetic pole having a first magnetic pole width H3 along the gap and the second magnetic pole having a second magnetic pole width H1 along the gap, the first magnetic pole width H3 and the second magnetic pole width H1 being chosen to satisfy the following relation H1<H3<3T<H2, wherein H2 is a physical tape contact width of the transducing head and 3T is a width of three adjacent recorded tracks traversed by the head.

5. The apparatus of claim 4, wherein at least one of the first magnetic pole and the second magnetic pole comprises a magnetic material and a magnetic thin film.

6. The apparatus of claim 4, wherein at least one of the first magnetic pole and the second magnetic pole comprises a non-magnetic material and a magnetic metal film.

7. The apparatus of claim 4, wherein the transducing head is mounted on a rotating scanner.

* * * * *